United States Patent Office 2,696,533
Patented Dec. 7, 1954

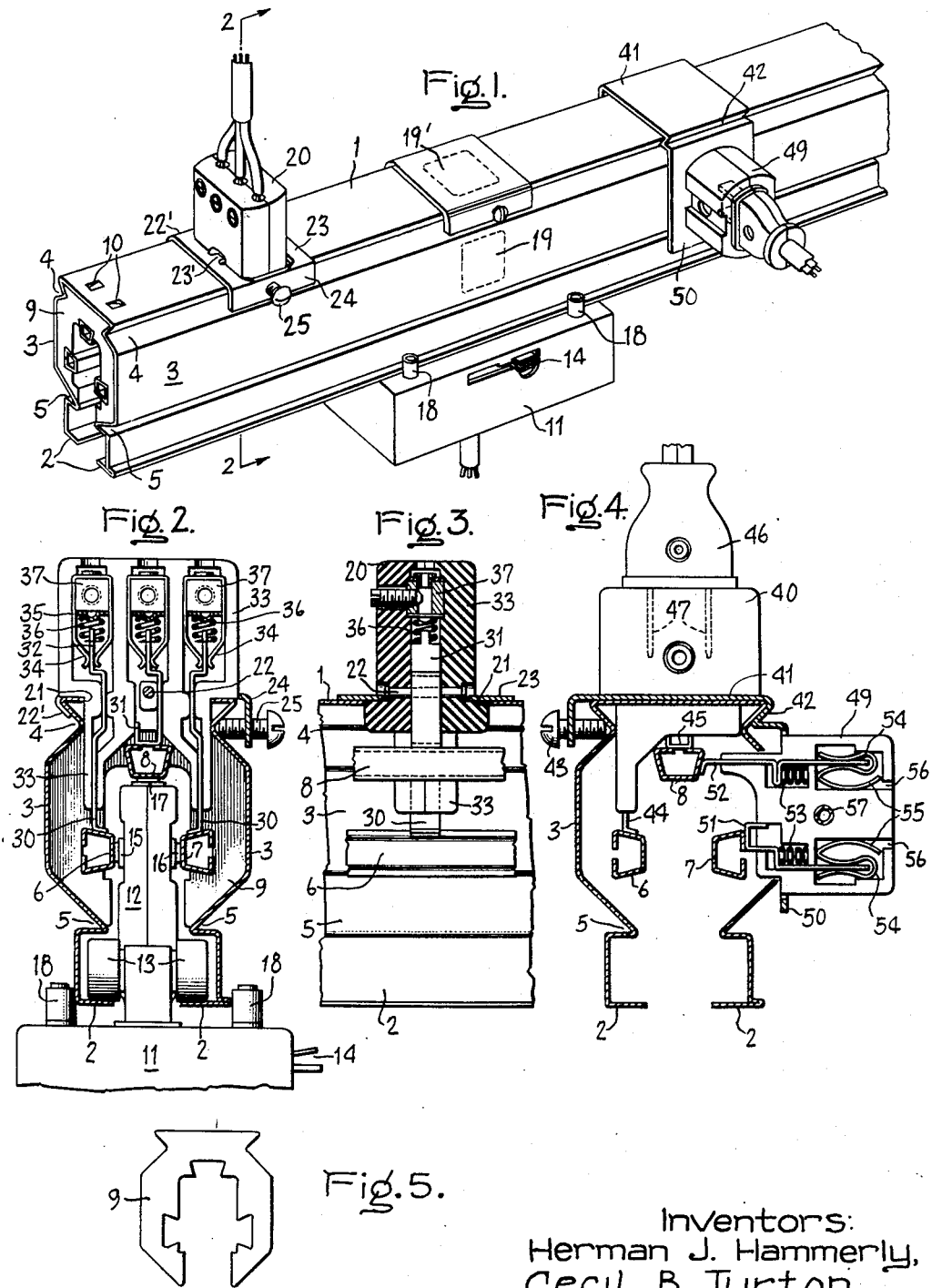

2,696,533

BUS-BAR DUCT SYSTEM AND ATTACHMENT

Herman J. Hammerly and Cecil B. Turton, Plainville, Conn., assignors, by mesne assignments, to General Electric Company, a corporation of New York Application December 4, 1950, Serial No. 199,070

5 Claims. (Cl. 191—23)

Our invention relates to power distribution systems and apparatus of the character set forth in the application of Herman J. Hammerly, Serial Number 73,570 filed January 29, 1949, now Patent Number 2,626,301, dated January 20, 1953, and assigned to the same assignee as the present invention.

One object is to provide an enclosed duct system of electrical power distribution which is adapted to plug-in connectors as well as trolley take-off at the same time.

Another object is to provide a system in which the bus bars have distinct surfaces for trolley take-off and plug-in connectors so that there will be no interference between the two types of connectors.

Another objcet is to adapt such a system to the use of distribution take-off devices inserted through the side or top of the duct and also accommodate the use of plug-in take-off devices and trolleys inserted through the lower part of the duct.

Fig. 1 is a perspective view showing a duct embodying the invention, with three branch take-off units in place.

Fig. 2 is a vertical sectional view of the duct on the plane of the line 2—2 of Fig. 1 showing a fragment of a trolley take-off suspended from the duct and also a special plug-in type of take-off connected to the bus bars through the top of the duct.

Fig. 3 is a vertical sectional view taken through the center of Fig. 2, the trolley take-off device being omitted.

Fig. 4 is a vertical sectional view of the duct showing a different type branch take-off device inserted through the top of the duct and one-half of another type take-off device inserted through the side of the duct.

Fig. 5 is a detail view of one of the insulating supporting plates.

The duct has a top wall 1, flanges 2, 2 at the bottom of the duct and side walls 3, 3 formed with inturned members 4, 4 at the top and 5, 5 near the bottom.

The bus bars 6, 7 and 8 are supported at intervals along the length of the duct by insulating members 9. These insulators may be held against longitudinal movement in the duct by lugs 10, 10 which interlock with the insulators.

A trolley take-off device 11 has an extension 12 and supporting rollers 13, 13 which travel on the flanges 2, 2 and are connected against vertical movement by the inturned members 5, 5. The trolley wheels may be actuated by means of mechanism having a lever 14 as more fully described in Patent 2,536,282 dated January 2, 1951. The insulating extension of the trolley take-off device has contact members 15, 16 and 17 adapted to travel along the inner faces of the bus bars 6, 7 and 8, respectively.

The take-off device 11 is provided with guide rollers 18, 18 which assist in guiding the rollers 13 along the flanged tracks 2, 2.

The duct may be provided with knockout members 19 at intervals along the top wall of the duct to accommodate insulating plug-in members 20. These knock-out members will be removed at the points where it is desired to plug in through an opening 21. The body of the plug-in device 20 is formed of two parts held together by a pin 22 and formed with extensions, and the insulating part is mounted on a plate member 23 which has an inturned integral lug 22' at one edge, a central interlocking lug 23' and a supporting lug 24 for the screw 25 at the other edge so that the branch take-off may be securely clamped to the duct.

This plug-in device 20 is provided with end contacts in the body extensions and a central contact 31 mounted between the two halves of the plug body. Each contact member has an extended portion such as 32 housed in the insulating body 33. The upper end of each contact member is slidably held between the jaws 34 of a terminal clip 35 and pressed downwardly by a spring 36 which presses against the lower face of the terminal block 37.

It will thus be seen that the construction is such that power may be drawn or fed through a trolley take-off inserted in the slot between flanges 2, 2 and also at the same time through a plug-in device inserted through an opening in a side wall or in the top wall since the contacts of the two devices are entirely independent of each other.

Openings like 21 in the top wall of the duct when not used or an opening formed by the removal of knockouts may be protected by a cover plate 19' mounted to slide along the top wall (Fig. 1).

In the form shown in Fig. 4, a take-off device 40 is carried by a clamp plate 41. An inturned lug 42 serves to embrace one of the grooves at the top of the duct while the screw member 43 at the opposite side projects into the opposite groove at the top of the duct. This plug-in device has a movable contact 44 for engaging the lateral bus bar 6 and another contact 45 which engages the central bus bar 8. These two contacts 44 and 45 are constructed and supported in a manner similar to those shown in Figs. 2 and 3. A knob 46 with blades 47 may be used to connect the plug-in device in any suitable manner.

Fig. 4 also shows the two-part body of a plug-in device 49 mounted on a clamp plate 50 and having contact members 51 and 52. These contacts are held between the two parts of the plug body and are pressed inwardly by springs such as 53. The outer end of each contact is clamped by a spring such as 54. This spring 54 has a portion 55 which serves to electrically engage a plug member to be inserted through the entrance 56. The two parts of the body 49 are held together by a rivet or screw 57. The clamp plate 50 also assists in holding the two parts together. This clamp plate may be integral with the clamp plate 41 as shown in Figs. 1 and 4.

The above mentioned duct system of the Hammerly application Serial Number 73,570 filed January 29, 1949, adapts itself to the use of either a trolley or a plug-in device, each of which device is made applicable to the duct through the slot or opening between the flanges 2, 2 at the bottom of the duct, and the plug-in device is adapted to be inserted either from the side of the duct or from the top of the duct and in fact all three forms may be used at the same time at suitable locations.

From the foregoing, it will be seen that bus bars are so constructed and supported in the duct that each bus bar has a contact surface to be engaged by a contact of a take-off device inserted through the slot in the bottom of the duct as shown in Fig. 2. Each bus bar also has another contact surface to be engaged by contacts inserted in the top wall of the duct and each bus bar has a contact surface to be engaged by a take-off device inserted through a side wall of the device.

We claim:

1. An electric power distribution system comprising an elongated duct having a plurality of flat walls, a plurality of current-conducting bus bars supported within said duct by longitudinally spaced insulating means, each of said bus bars having a plurality of flat outer surfaces, a continuous open slot in a first one of said walls of said duct for receiving a trolley-type power take-off device having contacts adapted to engage and ride along a first one of said flat outer surfaces of said bus bars, a plurality of longitudinally spaced discrete plug openings in at least one wall of said duct other than said first wall, a power take-off plug device insertable in each of said plug openings, said power take-off plug device comprising a body of insulating material mounted on said wall when inserted in said opening and having a portion extending into said duct through said opening, a plurality of resilient electrical conducting means supported within said body of insulating material and having portions extending through said duct-entering portion of said plug device and into electrically conducting frictional engagement with bus bar surfaces in said duct other than said first surface; and electrical conductors attached to said power take-off plug device.

2. An electric power distribution system comprising an elongated duct having a plurality of flat walls, a plurality of current-conducting bus bars supported within said duct by longitudinally spaced insulating means, each of said bus bars having a plurality of flat outer surfaces, a continuous open slot in a first one of said walls of said duct for receiving a trolley-type power take-off device having contacts adapted to engage and ride along a first one of said flat outer surface of said bus bars, a plurality of longitudinally spaced discrete plug openings in at least one wall of said duct other than said first wall, a power take-off plug device insertable in each of said plug openings, said power take-off plug device comprising a body of insulating material mounted on said wall and having a portion extending into said duct through said opening, a plurality of electrical conducting means slidably and resiliently supported within said body of insulating material and having portions extending through said duct-entering portion of said plug device for electrically conductively engaging bus bar surfaces in said duct other than said first surfaces; and electrical connecting means carried by said power take-off plug device for connecting said plug device to an electrical power consuming device.

3. An electric power distribution system comprising an elongated duct having a plurality of flat walls, a continuous open slot in a first one of said walls for receiving a trolley-type power take-off device having a plurality of contacts, a plurality of current-conducting bus bars supported within said duct by insulating means having longitudinally spaced portions, each of said bus bars having a plurality of flat outer surfaces, a first one of said bus bar surfaces being adapted to be contacted by said contacts of said trolley-type power take-off device, a second one of said bus bar surfaces confronting a second one of said flat walls of said duct, a plurality of longitudinally spaced discrete plug openings in said second wall of said duct, a power take-off plug device insertable in each of said plug openings, said power take-off plug device comprising a body of insulating material mounted on said wall and having a portion extending into said duct through said opening, a plurality of resilient electrical conducting means supported within said body of insulating material and having portions extending through said duct-entering portion of said plug device for electrically conducting engagement with said second one of said bus bar surfaces, and electrical connecting means carried by said power take-off plug device for connecting said device to an electrical power consuming device.

4. An electric power distribution system comprising an elongated duct having a plurality of flat walls, a plurality of current-conducting bus bars supported within said duct by longitudinally spaced insulating means, each of said bus bars having a plurality of flat outer surfaces, a continuous open slot in a first one of said walls of said duct for receiving a trolley-type take-off device having contacts adapted to engage and ride along the first one of said flat outer surfaces of said bus bars, a plurality of longitudinally spaced discrete plug openings in at least one wall of said duct other than said first wall, a power take-off plug device insertable in each of said plug openings, said power take-off device comprising a body of insulating material mounted on said wall and having a portion extending into said duct through said opening, a plurality of resilient electrical conducting means supported within said body of insulating material and having portions extending through said duct-entering portion of said plug device and into electrically conducting frictional engagement with bus bar surfaces in said duct other than said first surfaces, and a plurality of prong-receiving sockets carried by said body of insulating material externally of said duct.

5. An electric power distribution system comprising an elongated duct having a plurality of flat walls, a plurality of current-conducting bus bars supported within said duct by longitudinally spaced insulating means, each of said bus bars having a plurality of flat outer surfaces, a continuous open slot in a first one of said walls of said duct for receiving a trolley-type power take-off device having contacts adapted to engage and ride along a first one of said flat outer surfaces of said bus bars, a plurality of longitudinally spaced discrete plug openings in at least one wall of said duct other than said first wall, a power take-off plug device insertable in each of said plug openings, said power take-off plug device comprising a body of insulating material comprising a main body portion and a duct-entering portion, a clamping plate carried by said plug device adjacent the meeting line of said main body portion and said duct-entering portion, means for securing said clamping plate to a wall of said duct other than said first wall, a plurality of resilient contacts carried by said plug device and projecting through said duct-entering portion of said plug body and having means within said main body portion for connection to power take-off conductors.

References Cited in the file of this patent

UNITED STATES PATENTS

| Number | Name | Date |
|---|---|---|
| 1,613,959 | Propp | Jan. 11, 1927 |
| 2,128,135 | Glasgow | Aug. 23, 1938 |
| 2,443,387 | Harris | June 15, 1948 |
| 2,444,648 | Jackson et al. | July 6, 1948 |

FOREIGN PATENTS

| Number | Country | Date |
|---|---|---|
| 576,696 | Great Britain | Apr. 16, 1946 |